UNITED STATES PATENT OFFICE.

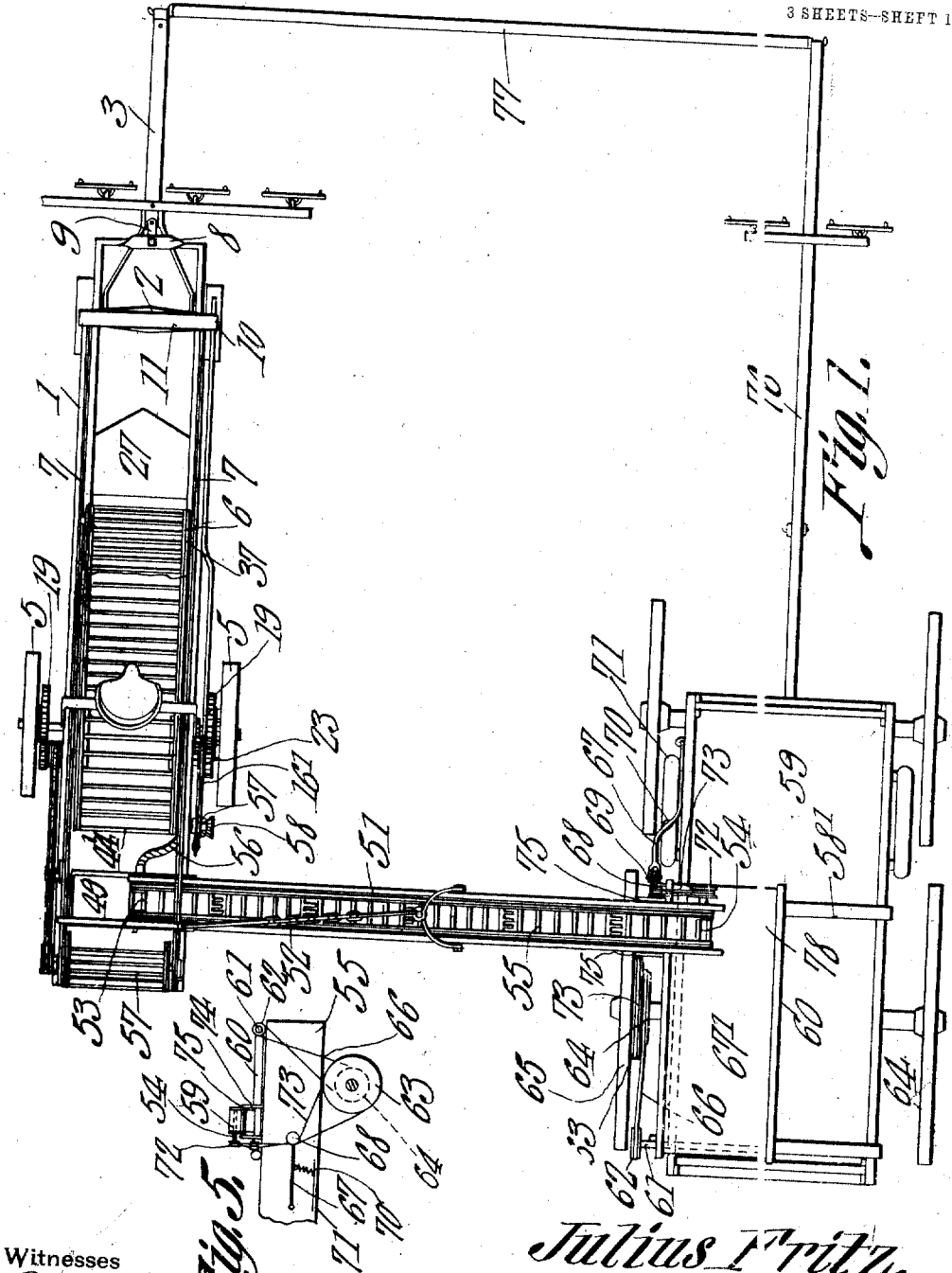

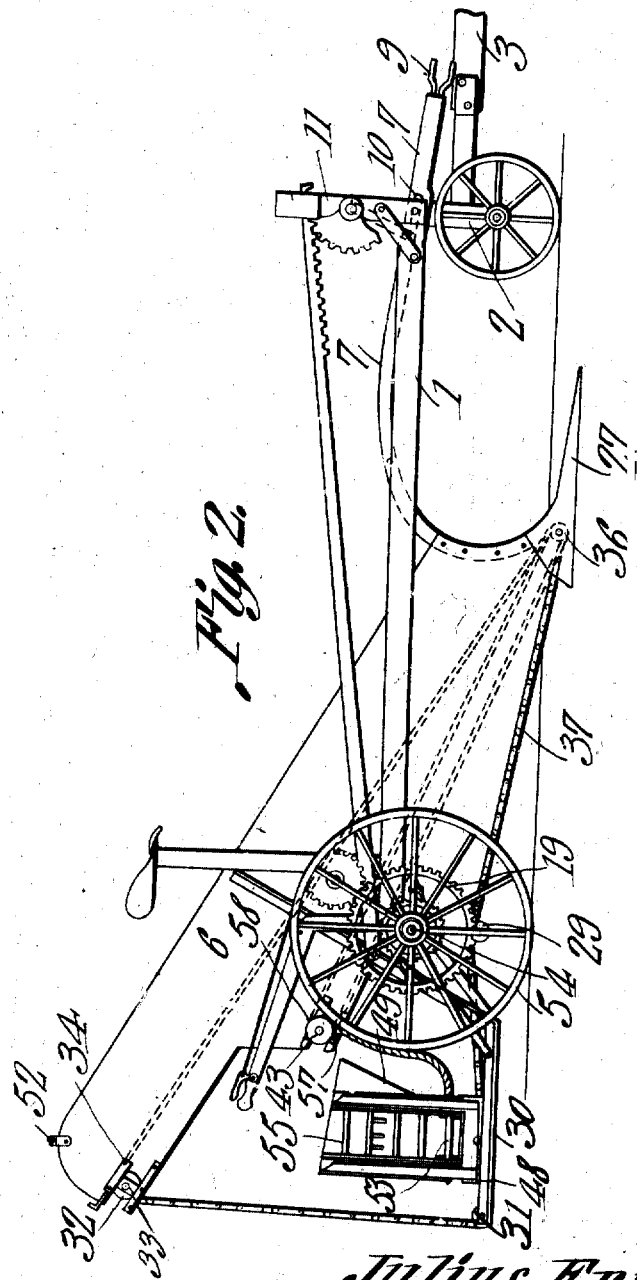

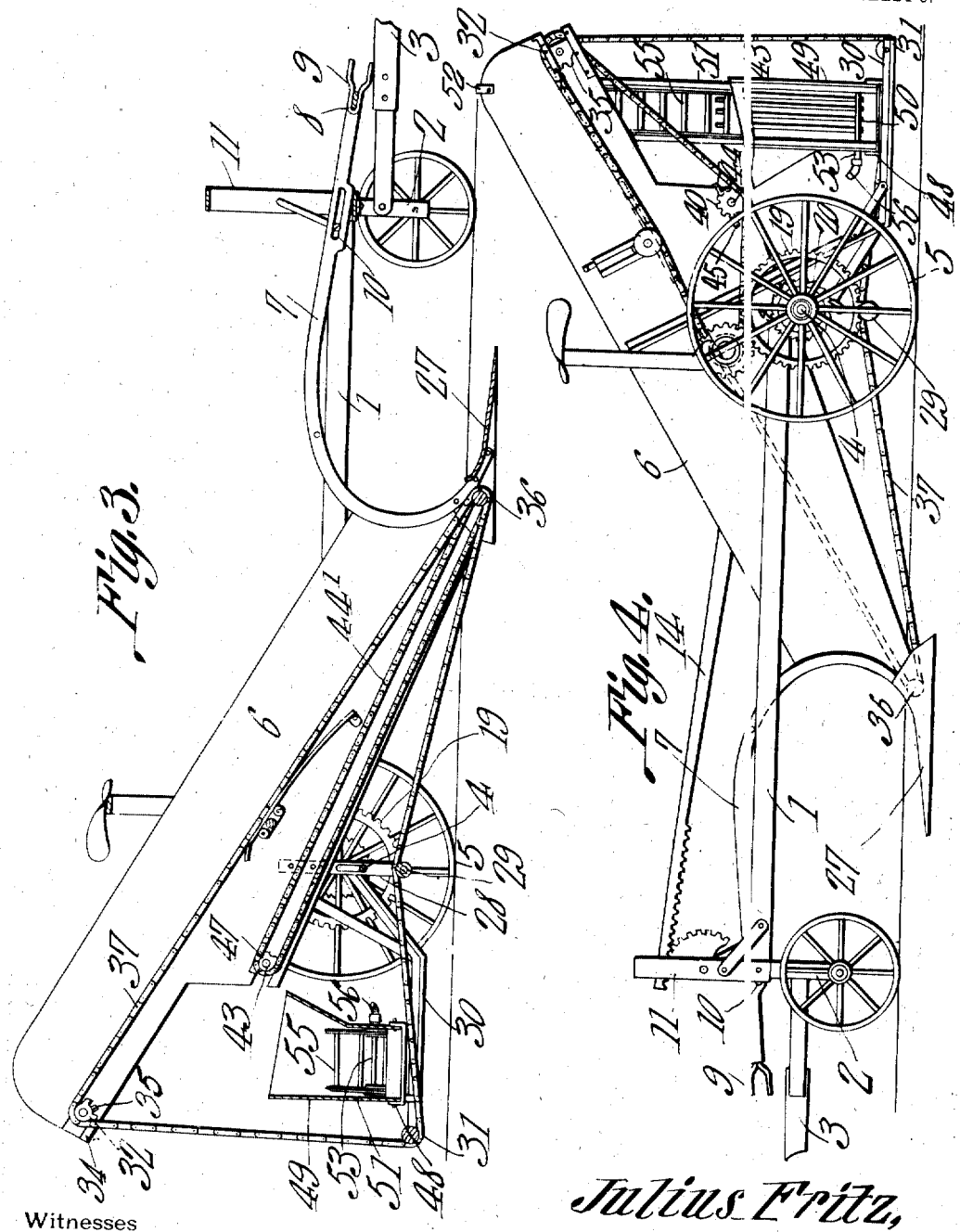

JULIUS FRITZ, OF NEWARK, SOUTH DAKOTA.

POTATO DIGGER AND LOADER.

1,008,534.  Specification of Letters Patent.  Patented Nov. 14, 1911.

Application filed June 3, 1910. Serial No. 564,767.

*To all whom it may concern:*

Be it known that I, JULIUS FRITZ, a citizen of the United States, residing at Newark, in the county of Marshall and State of South Dakota, have invented a new and useful Potato Digger and Loader, of which the following is a specification.

This invention relates to an improvement in potato diggers and loaders, the primary object of the invention being the provision of a digger having a conveyer leading away therefrom, and having one end thereof resiliently supported, combined with a spaced receiving wagon whereby the material dug, is conveyed to the wagon.

In the accompanying drawings:—Figure 1 is a top plan view of the digger and loader. Fig. 2 is a side elevation of the digger. Fig. 3 is a longitudinal sectional view of the digger. Fig. 4 is a side elevation of the digger viewing the same from the side opposite to that as illustrated in Fig. 2. Fig. 5 is a diagrammatic view of beltings employed upon the wagon.

Referring to the drawings, the numeral 1 designates the digger proper, having the wheeled truck 2, the draft tongue 3, and the U-shaped rear axle 4, provided with traction wheels 5. A trunk 6 is supported upon the axle 4, and the beams 7 are attached at their rear ends to the forward ends of the trunk 6, while to the forward ends of the beams 7, which are slotted as at 10, are secured together by means of the cross bar 8. A clevis 9 is located upon the cross bar 8 and above the rear end of the draft tongue 3. A yoke 11 is mounted upon the forward portion of the frame 1, and serves as a guide for the forward end portion of the beams 7. A digging share 27 is supported at the lower ends of the beams 7. Arms 28 depend from the intermediate portion of the trunk 6 and a roller 29 is journaled for rotation between said arms at a position elevated above the surface of the ground.

The platform 30 is supported at the rear end portion of the trunk 6, and is provided at its rear end with a journaled roller 31. A roller 32 is journaled in the bearings 33, which are adjustably mounted in the guides 34, provided upon the sides of the trunk 6. The roller 32 is provided with two sets of teeth 35. A roller 36 is journaled to the share 27 below the rear ends thereof, and is spaced a short distance from the same.

An endless conveyer 37 is arranged to move about the rollers 31, 32, 36 and over the roller 29 supported by the arms 28. The upper run of the said conveyer passes over the guide strip 26 and is in contact with the same. The endless conveyer 37 is made up of a series of rods linked together at their ends and having their intermediate portions spaced from each other, the space between the intermediate portions of said rods being sufficient to permit potatoes and soil to pass through, but the said intermediate portions of the rods are in such close relation as to prevent the foliage of the plants from passing down between the same. By this means a digging and harvesting device may be used to dig and convey the potatoes from the ground where they may be delivered free of dirt and vines to a wagon which is adapted to be at the side of and operate in parallel with the digger and harvester.

The sprocket wheel 40 is fixed to a shaft 43, which in turn is journaled in the bearings 44 adjustably mounted in guides 45 located at the sides of the trunk 6. Sprocket wheels 47 are mounted upon the intermediate portion of the shaft 43.

A conveyer 44' is located within the conveyer 37 and passes around the sprocket wheel 47 upon the shaft 43 and the roller 36 is journaled at the rear portion of the share 27. The conveyer 44' is similar in structure to the conveyer 37 with the exception that the intermediate portions of the bars are closer together and here is not space between the bars and the said conveyer to permit the potatoes to fall through.

A yoke 48 is pivoted upon the platform 30 for horizontal swinging movement and a hopper 49 is pivoted between the ends of the yoke 48 for vertical swinging movement. The hopper 49 is provided with an inclined slatted bottom section 50 and the lower end of a conveyer trunk 51 is fixed to the hopper 49 and is in synclinal relation to the bottom section 50 thereof. A bridle member 52 is connected at one end with the upper portion of the trunk 6 and at its other end with the outer portion of the trunk 51 and is adapted to hold the said trunk 51 at a desired inclination. A shaft 53 is journaled for rotation at the lower end of the trunk 51 and a shaft 54 is journaled for rotation at the upper outer end thereof. An endless open conveyer 55 is arranged to move longitudinally along the trunk 51 and around the said shafts 53 and 54. A flexible shaft 56 is connected at one end with one end of the shaft 53 and at its other end is connected with a pinion 57 which is journaled for rotation at the side of the trunk 6 and meshes with a pinion 58 fixed to the end of the shaft 43.

A frame 58' is adapted to be applied to the upper edges of a wagon body 59 and a conveyer trunk 60 is located upon the said frame. A shaft 61 is journaled for rotation at one end of the trunk 60 and is provided with a belt wheel 62. Belt pulleys 63 and 64 are attached to one of the wagon wheels 65 and a belt 66 passes around the belt wheel 64 and belt pulley 62 and is adapted to rotate the shaft 61. An arm 67 is pivotally attached to the side of the wagon body 59 and carries at its free end belt pulleys 68 and 69. The free end of the arm 67 is under the tension of coiled spring 70 one end of which is attached to the said arm and the other end is attached to the step 71 of the wagon body or other part of the body. A belt pulley 72 is fixed to one end of the shaft 54 journaled at the upper end of the conveyer trunk 51. In case it should be so desired a belt 73 is passed around the belt wheel 63 thence under the belt pulleys 68 and 69 and over the pulley 72 and thus may serve as means for rotating the shaft 54. Inasmuch as the arm 67 is under spring tension the upper outer portion of the trunk 51 is resiliently held in position between two arms and upon a roller which will now be described.

A roller 74 is journaled at the outer side of the trunk 60 and the upper outer end of the trunk 51 rests upon the said roller. Upwardly and outwardly disposed arms 75 are attached to the outer side of the trunk 60 and receive the upper outer portion of the trunk 51 between them.

The tongue 76 of the wagon is connected at its forward end by means of a spacing bar 77 with the forward end of the tongue 3 of the digger.

The operation of the digger and loader is as follows. Presuming that the digger and loader are connected together in the manner as illustrated in Fig. 1 of the drawings and the parts of the digger are in the position shown in Fig. 3. As the digger and loader are drawn in a forward direction the share 27 will pass under the tubers and lift the same together with top soil and the vines upon the upper run of the conveyer 37. The potatoes and soil will fall through the links of the said conveyer while the vines will rest upon the upper run and will be carried up and passed over beyond the end of the trunk 6. The tubers will drop down between the links of the conveyer 37 upon the links of the conveyer 44' and the soil will pass through the spaces between the links 44' and deposit upon the ground. The potatoes are carried up by the upper run of the conveyer 44' and are deposited in the hopper 49. The potatoes are then engaged by the conveyer 55 in the trunk 51 and are carried up and deposited upon the upper run of a belt 78 which is actuated by the shaft 61 and which moves longitudinally of the trunk 60. The dirt and sand which fall upon the upper run of the belt 78 are carried rearwardly and deposited upon the ground beyond the end of the wagon body 59 while the potatoes which are deposited upon the belt 78 are picked by an operative standing in the wagon body 59 and deposited in a sack provided within the said wagon body.

Having described the invention what I claim as new and desire to secure by Letters Patent is:—

1. A digger and loader comprising a digger proper, a conveyer mounted for movement away from the digger, a wagon having its tongue spaced from the tongue of the digger, and a frame located upon the body of the wagon for resiliently supporting one end of the conveyer.

2. A digger and loader comprising a digger proper, a wagon arranged to travel at the side of the digger in predetermined relation, a conveyer leading from the digger to the wagon and operated from the digger, and means for resiliently supporting the conveyer on the wagon.

3. A digger and loader comprising a digger proper, a wagon arranged to travel at the side of said digger in predetermined relation, a conveyer leading from the digger to the wagon and operated from the digger, guides mounted upon the wagon which guides receive between them the delivery end portion of the said conveyer whereby the said conveyer may move longitudinally within the guides but is restrained against lateral movement along the wagon, a belt operated from the wagon and operatively connected with the conveyer and a slack absorbing device mounted upon the wagon and engaging the said belt.

4. A digger and loader, comprising a digger proper, a wagon arranged to travel at the side of the digger in predetermined relation thereto, a conveyer leading from the digger to the wagon and operable from the digger, and means for preventing any slack movement between the free end of the conveyer and the wagon.

5. A digger and loader, comprising a digger proper, a wagon arranged to travel at the side of the digger in predetermined relation thereto, a conveyer leading from the digger to the wagon and operable from the digger, and a slack absorbing device carried by the wagon and engaging the conveyer to regulate the distance between the free end of the conveyer and the wagon.

6. A digger and loader, comprising a digger proper, a wagon arranged to travel at the side of the digger in predetermined relation thereto, a conveyer leading from the digger and having its free end above the wagon, said conveyer being operably connected to the digger, and means for restraining the lateral movement of the conveyer with relation to the wagon.

In testimony that I claim the foregoing as my own, I have hereto affixed my signature in the presence of two witnesses.

JULIUS FRITZ.

Witnesses:
 WM. GREENWOLDT,
 ED. SCHULTZ.